INVENTOR.
MARION I. LEVY
BY
ATTORNEYS

July 2, 1963
M. I. LEVY
3,095,637
METHOD OF MAKING BLOWER BLADE SHEET
Filed Jan. 26, 1959
2 Sheets-Sheet 2
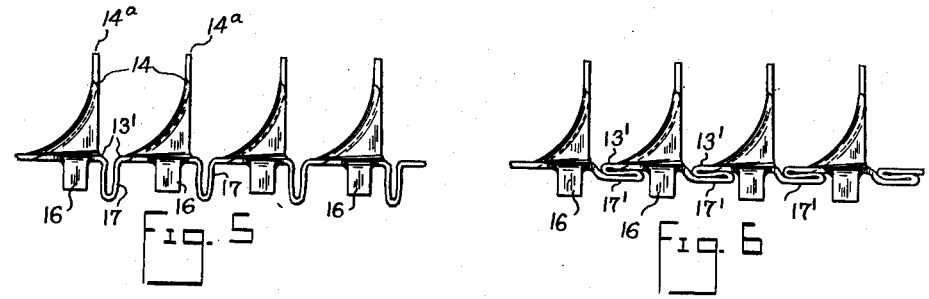
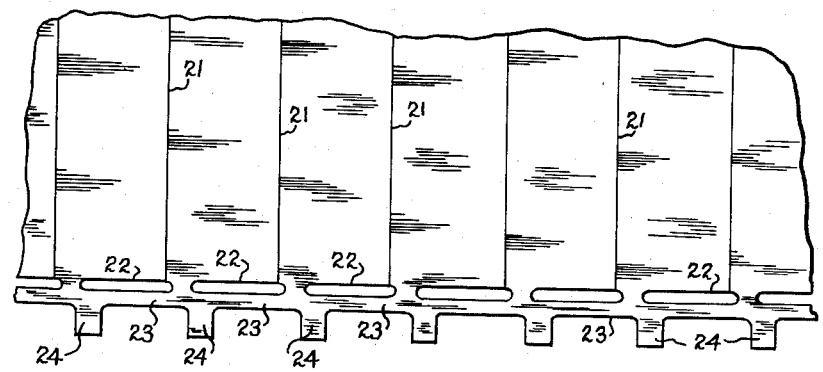
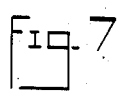
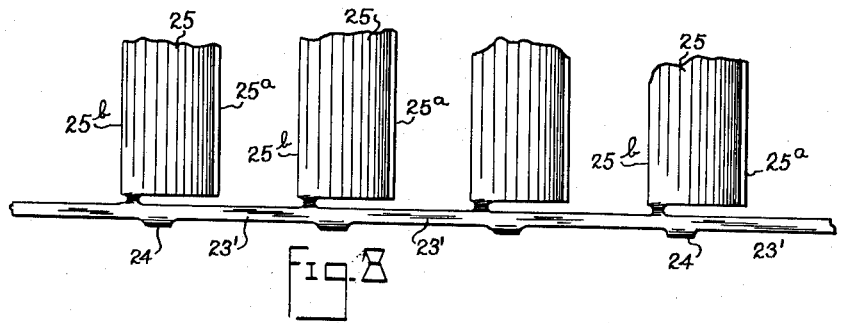
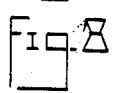
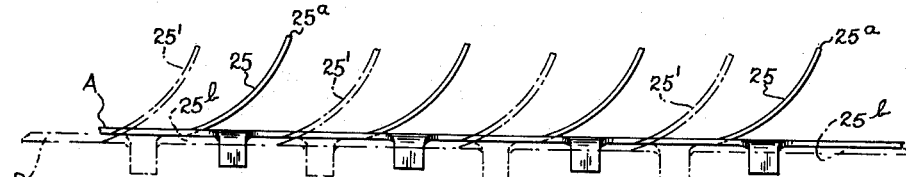
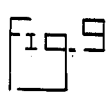
INVENTOR.
MARION I. LEVY
BY
*Hyde, Meyer, Baldwin & Doran*
ATTORNEYS United States Patent Office 3,095,637
Patented July 2, 1963

3,095,637
METHOD OF MAKING BLOWER BLADE SHEET
Marion I. Levy, Shaker Heights, Ohio, assignor, by mesne assignments, to The Lau Blower Company, Dayton, Ohio, a corporation of Ohio
Filed Jan. 26, 1959, Ser. No. 788,821
3 Claims. (Cl. 29—156.8)

This invention relates to improvements in a blower blade sheet and in a method for making the same.

One of the objects of the present invention is to provide a novel method for forming a blower blade sheet wherein a plurality of generally parallel blades are stamped out of a single sheet of metal after which the metal is folded generally into a cylinder, supplied with a pair of end rings and then mounted upon a driving shaft so that upon rotation of the blower air is sucked in centrally or axially of the blower and discharged between the blades radially outwardly.

One of the objects of the present invention is to form a blower blade sheet by the process of blanking out a flat sheet of metal, cutting through the sheet a series of parallel slits crosswise of the sheet to define the leading and trailing edges of a series of blades and cutting through the sheet a series of disconnected slots at the ends of the blades running generally lengthwise of the sheet and spaced a short distance inwardly of the sides of the sheet and leaving a continuous marginal strip along each side of the sheet, and thereafter stretching these marginal strips and bending the blades out of the plane of the original sheet into the conformation desired in the finished blower. In this fashion I am able to space the blades farther apart by the amount of the stretching of the marginal strips.

In the method or process as outlined in the preceding paragraph, the slots at the ends of the blades may be made parallel to the edges of the sheet which provides an acceptable form of blade which, however, is not reinforced at the ends of blades where they join the marginal strips.

In a modification of the above method, the slots cut at the oposite ends of each blade diverge laterally away from the trailing edge of the blade leaving a gusset of metal between this trailing edge and each adjacent marginal strip, afterward the blades are bent out of the plane of the original sheet and at the same time these gussets are bent generally at right angles to the sheet so as to form reinforcing portions integral with the blades and the marginal strip and giving a very strong structure at the ends of the blades, all of this being done very inexpensively.

Another novelty in the present invention is the blanking out of a flat sheet of metal as described above by cutting through the sheet a series of parallel slits crosswise of the sheet to mark out the blades and also cutting a series of disconnected slots at the ends of the blades running generally lengthwise of the sheet and spaced a short distance inwardly of the sides of the sheet and leaving a continuous marginal strip along each side of the sheet, and thereafter stretching this marginal strip and forming a bight in each marginal strip between adjacent blades after which this bight is folded substantially flat against the marginal strip so as to provide the desired spacing of the blades and so that the additional material of these bights gives a stronger structure at the ends of the blades when the end rings are spun into place.

A further object of the present invention is to provide the improved blower blade sheet formed by the above mentioned method, namely, a sheet having a continuous marginal strip running longitudinally along each side thereof, these strips being coplanar and generally parallel to each other, a plurality of substantially parallel blades extending between said strips, each of these blades being integrally connected at its opposite ends with said strips, each blade having its trailing edge bent away from the plane of the strips and a gusset at each end of each blade between the trailing edge side of the associated blade and the adjacent strip and integral with both the blade and the strip. A modification of this blade sheet includes in each marginal strip a bight of strip material folded flat against the strip between adjacent blades and spacing the blades in the desired manner and reinforcing the marginal strips there.

In the drawings,

FIG. 5 is an end elevational view of the sheet of FIG. 4 after it has had an additional forming operation;

FIG. 6 is a view similar to FIG. 5 after an additional forming operation has been performed on the sheet of FIG. 5;

FIG. 7 is a fragmental top plan view of a blower blade sheet blanked out in the flat according to another embodiment of my invention;

FIG. 8 is a top plan view of a portion of the sheet of FIG. 7 after the blades have received their forming operation; while FIG. 9 illustrates a manner of assembling two sheets like FIG. 8 into a final blower wheel pattern.

It is generally old to blank out of a flat sheet of metal of substantially uniform thickness a series of parallel blades which are bent into the desired blade form and then folded generally into a cylindrical member to which two end rings are attached and then one or more spiders is provided so as to support the blower blade mechanism from a central rotating shaft. However, in these prior blade sheets, it has been difficult to arrive at the optimum spacing of the parallel blades around the periphery of the blower wheel. It is an object of the present invention to provide a novel solution for this problem.

It should be understood at the outset, that FIGS. 1, 2, 4, 7 and 8 represent one side edge of a symmetrical blade sheet which is identical about a longitudinally extending center line except that one end is right-hand and the other end is left-hand on opposite sides of the center line. It is believed unnecessary to reproduce the structure of these figures showing the other side of the blade sheet.

Figure 1:
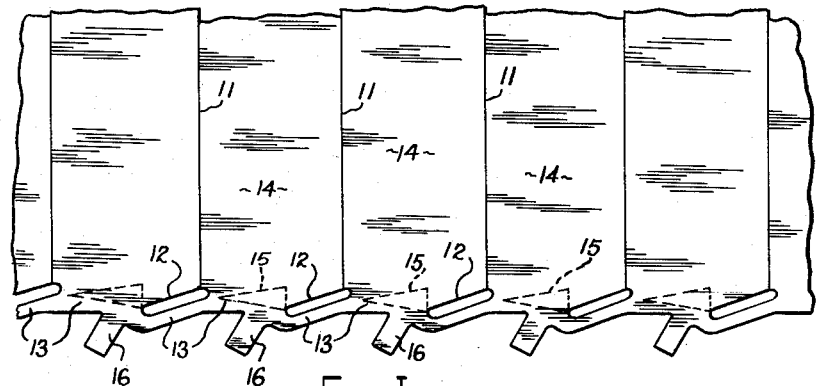
FIG. 1 is a fragmental plan view of a portion of a blower blade sheet as blanked out of flat metal utilizing one form of my invention.

In FIG. 1 is shown a blank comprising a flat sheet of metal of substantially uniform thickness having one longitudinally extending side edge at the lower side of the figure, it being understood that the other longitudinal side edge is parallel. My improved method includes the step of cutting through this blank sheet a series of parallel slits 11 crosswise of the sheet to define the leading and trailing edges of a series of substantially parallel blades. By the term "slit" in the specification and claims I include also a slot where some metal is removed. The blank formation is then continued by cutting through the sheet a series of disconnected slots 12 at the ends of the blades running generally lengthwise of the sheet and another form of which will be described in connection with FIG. 7. This series of disconnected slots runs generally lengthwise of the sheet and is spaced a short distance inwardly of the sides of the sheet leaving a continuous marginal strip 13 along each of the longitudinally extending sides of the sheet.

This blank provides a continuously repeated structure long enough to go completely around a generally cylindrical blower wheel similar to the type shown in the copending application of Philip Borkat, Serial No. 462,905, filed October 18, 1954, now Patent No. 2,915,239, issued December 1, 1959, and many other blower wheels of a similar character in common use today.

The parallel slits 11 of FIG. 1 define between them a series of blade material portions 14, the further bending of which will be presently described. The slots 12 at the opposite ends of each blade portion 14 diverge laterally away from the trailing edge of each blade leaving a gusset 15 of metal generally triangular in form as outlined in broken lines in FIG. 1 which later becomes a reinforcing piece at the end of each blade.

Figure 2:
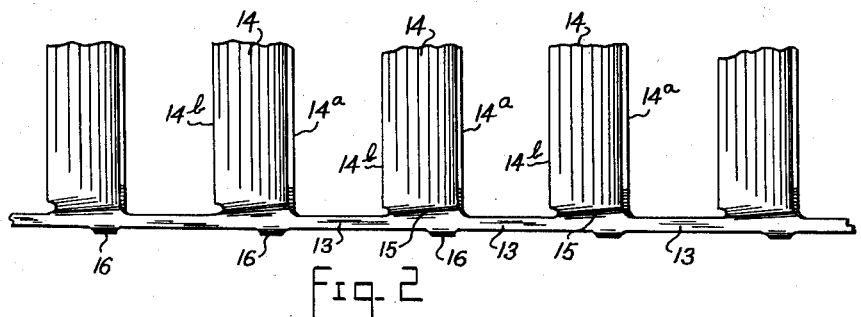
FIG. 2 is a fragmental top plan view of the sheet of FIG. 1 bent into an intermediate form.

FIG. 2 shows a forming step which has been applied to FIG. 1 by straightening out the marginal strips 13, bending the trailing edge 14a of each blade out of the plane of the original sheet and at the same time bending the gussets 15 generally at right angles to the sheet while these gussets are still integrally attached to their associated blade and marginal strip 13.

Figure 3:
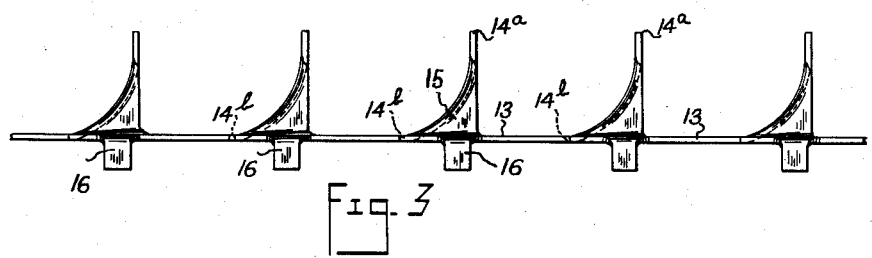
FIG. 3 is an end elevational view of the sheet of FIG. 2.

Tabs 16 are blanked out along each side of the blank illustrated in FIG. 1 and these are later turned downwardly at right angles to the original plane of the blank sheet as indicated in FIGS. 2 and 3 during subsequent bending operations. These assist in attaching the blade sheet to the end rings and probably require no other comment in this description.

Figure 4:
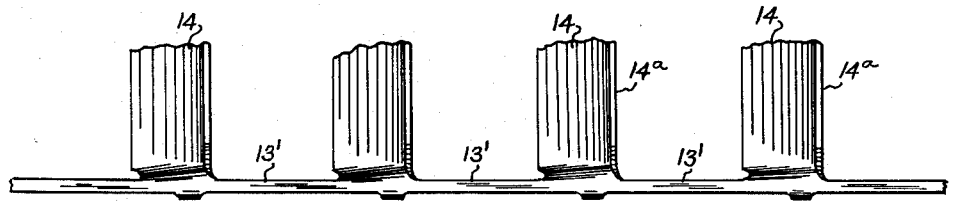
FIG. 4 is a view like FIG. 2 except that a metal stretching operation has taken place between FIGS. 2 and 4.

The blade sheet may then be further formed as shown in FIGS. 5 and 6, but preferably is first stretched slightly from the condition of FIG. 2 to the condition of FIG. 4 wherein the marginal strips at 13' are elongated from the condition shown at 13 in FIG. 2.

In order to bring the blades 14 from the condition of FIG. 4 to a more optimum spacing for efficient blower action, the next forming step taken is to provide a bight 17 in each marginal strip 13' between adjacent blades, these bights being bent in the same direction as the tabs 16, namely, in a direction away from the original blank sheet which is opposite to the direction of the trailing edges 14a of the blades.

The next forming step is to fold the bights of FIG. 5 into the position 17' of FIG. 6 where they are substantially flat against the marginal strips 13' and in planes generally parallel to the original plane of the blank sheet. It will be noted from FIG. 6 that the portions 17' and 13' provide three contiguous parallel layers of metal extending substantially from one tab 16 to the next. When an annular end ring is spun onto the layers of metal and the tab 16, as is common in the industry, a very strong end construction at the opposite ends of the blade sheet is provided.

Another form of the invention which has some, but not all, of the advantages of the form already described is shown in FIGS. 7 and 8. Here the blower blade sheet is blanked out by cutting a series of parallel slits 21 crosswise of the sheet to define the leading and trailing edges of a series of blades and then cutting through the sheet a series of disconnected slots 22 at the ends of the blades and running generally lengthwise of the sheet and spaced a short distance inwardly of the sides of the sheet and leaving a continuous marginal strip 23 along each side thereof. Here the slots are parallel to the edges of the sheet with the slots at one side of the sheet parallel to the slots at the other side of the sheet (not shown). The tabs 24 are provided for the same purpose as the tabs 16 in the previously described form.

The sheet of FIG. 7 is then bent into the form shown in FIGS. 8 and 9 wherein the trailing edge 25a of each blade 25 is bent upwardly out of the plane of the original sheet while the leading edge 25b of each blade remains in the plane of the original blank sheet. It will be noted that in this form of the invention the gusset 15 is eliminated along with its reinforcing effect at the ends of the blades. It will be noted that the marginal strips 23 of FIG. 7 have been stretched to the form shown at 23' in FIG. 8 so as to provide the desired spacing between adjacent blades 25.

The sheet of FIG. 8 could then be formed as taught in FIGS. 5 and 6 to provide a blower wheel. However, the sheet of FIG. 8 may be so constructed as to lend itself to the formation of another type of blower wheel wherein the blades 25 of sheet A shown in full lines in FIG. 9 are alternated between the blades 25' of an identical sheet B shown in dot-dash lines in FIG. 9. In other words, I utilize my invention of stretching the marginal strips 23' to space the blades 25 at a distance twice that desired in an optimum blower wheel. Then, by putting two of these identical sheets together, I may arrive at the optimum spacing between the blades 25 and 25' as illustrated in FIG. 9. It will be understood by those skilled in the art that the structure of FIG. 9 is then rolled into two end supporting rings as previously described so as to provide a generally cylindrical blower wheel.

It will be readily understood that two of the sheets of FIG. 4 might be put together in the manner taught in FIG. 9 if desired.

What is claimed is:

1. The method of forming a blower blade sheet which comprises the steps of blanking out a flat sheet of metal by cutting through said sheet a series of parallel slits extending crosswise thereof to define the leading and trailing edge of a series of blade portions, cutting through said sheet a series of disconnected slots located at the ends of said blade portions with said slots extending generally lengthwise of said sheet and spaced a short distance inwardly of the sides thereof to create a continuous marginal strip along each side of said sheet, said slots diverging laterally at a predetermined angle from the trailing edge of said blade portions to define an inner edge of said marginal strips, trimming the outer edge of said marginal strip opposite said slots to said predetermined angle so that said marginal strips have a uniform width opposite said slots, said slots spaced apart a predetermined distance to leave a gusset of metal between said slots and between each said marginal strip and the remainder of said blade including the leading edge thereof, deforming said blade portions out of the plane of said sheet to form blades, and bending said gussets generally at right angles to the plane of said sheet and straightening said marginal strips to substantially parallel relation with the longitudinal axis of said sheet for increasing the spacing between said blades.

2. The method of forming a blower blade sheet which comprises the steps of blanking out a flat sheet of metal by cutting through said sheet a series of parallel slits extending crosswise thereof to define the leading and trailing edge of a series of blade portions, cutting through said sheet a series of disconnected slots located at the ends of said blade portions with said slots extending generally lengthwise of said sheet and spaced a short distance inwardly of the sides thereof to create a continuous marginal strip along each side of said sheet, said slots diverging laterally at a predetermined angle from the trailing edge of said blade portions to define an inner edge of said marginal strips, trimming the outer edge of said marginal strip opposite said slots to said predetermined angle so that said marginal strips have a uniform width opposite said slots, said slots spaced apart a predetermined distance to leave a gusset of metal between said slots and between each said marginal strip and the remainder of said blade including the leading edge thereof, forming a tab projecting obliquely outwardly from said marginal strips opposite said gussets, deforming said blade portions out of the plane of said sheet to form blades, and bending said gussets generally at right angles to the plane of said sheet and stretching said sheet to straighten said marginal strips to substantially parallel relation with the longitudinal axis of said sheet for increasing the spacing between said blades and at the same time causing said tabs to project normally from said strips in the plane of said sheet.

3. The method of forming a blower blade sheet which comprises the steps of blanking out a flat sheet of metal by cutting through said sheet a series of parallel slits extending crosswise thereof to define the leading and trailing edge of a series of blade portions, cutting through said sheet a series of disconnected slots located at the ends of said blade portions with said slots extending generally lengthwise of said sheet and spaced a short distance inwardly of the sides thereof to create a continuous marginal strip along each side of said sheet, said slots diverging laterally at a predetermined angle from the trailing edge of said blade portions to define an inner edge of said marginal strips, trimming the outer edge of said marginal strip opposite said slots to said predetermined angle so that said marginal strips have a uniform width opposite said slots, said slots spaced apart a predetermined distance to leave a gusset of metal between said slots and between each said marginal strip and the remainder of said blade including the leading edge thereof, forming a tab projecting obliquely outwardly from said marginal strips opposite said gussets, deforming said blade portions out of the plane of said sheet to form blades, and bending said gussets generally at right angles to the plane of said sheet and straightening said marginal strips to substantially parallel relation with the longitudinal axis of said sheet for increasing the spacing between said blades and at the same time causing said tabs to project normally from said strips in the plane of said sheet.

References Cited in the file of this patent
UNITED STATES PATENTS

| | | |
|---|---|---|
| 1,919,984 | Murphy | July 25, 1933 |
| 2,142,637 | Faber | Jan. 3, 1939 |
| 2,242,586 | Marbach | May 20, 1941 |
| 2,291,480 | Marbach | July 28, 1942 |
| 2,470,966 | Abbott et al. | May 24, 1949 |
| 2,684,521 | Morrison | July 27, 1954 |
| 2,833,464 | Sharp | May 6, 1958 |